INVENTORS.
William Leroy Reiter
Stanley J. Gartner
Henry W. Roeber
BY Arthur L. B. Richardson
THEIR ATTORNEY

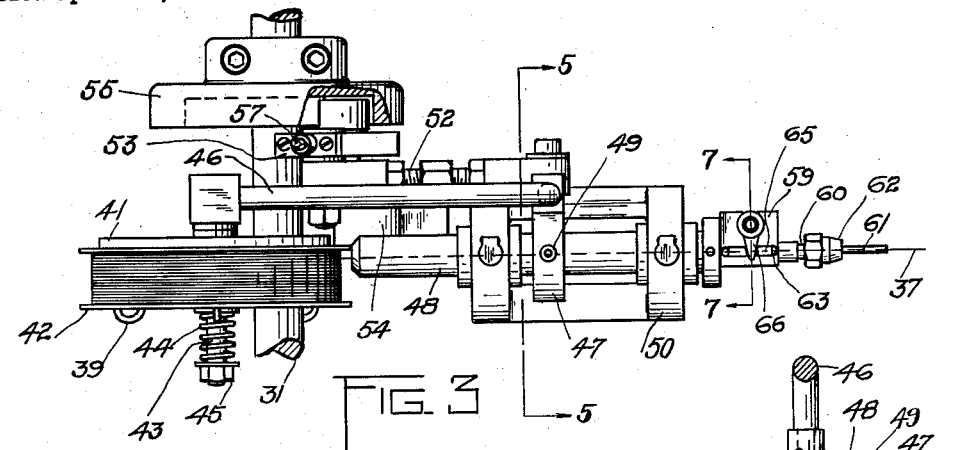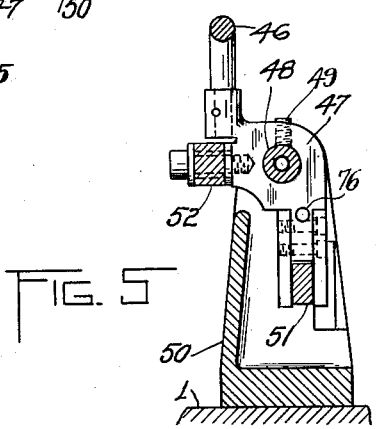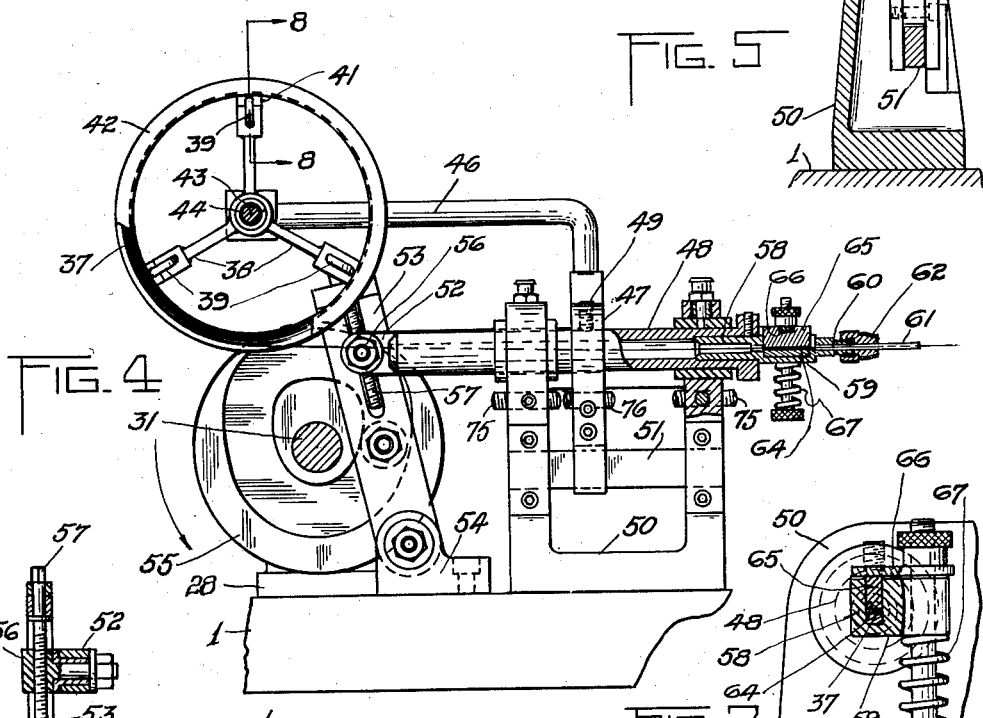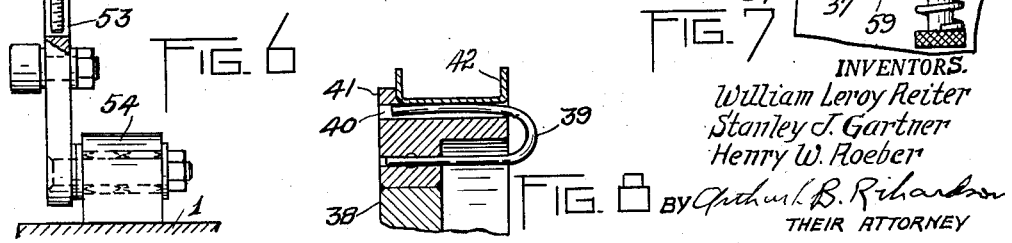

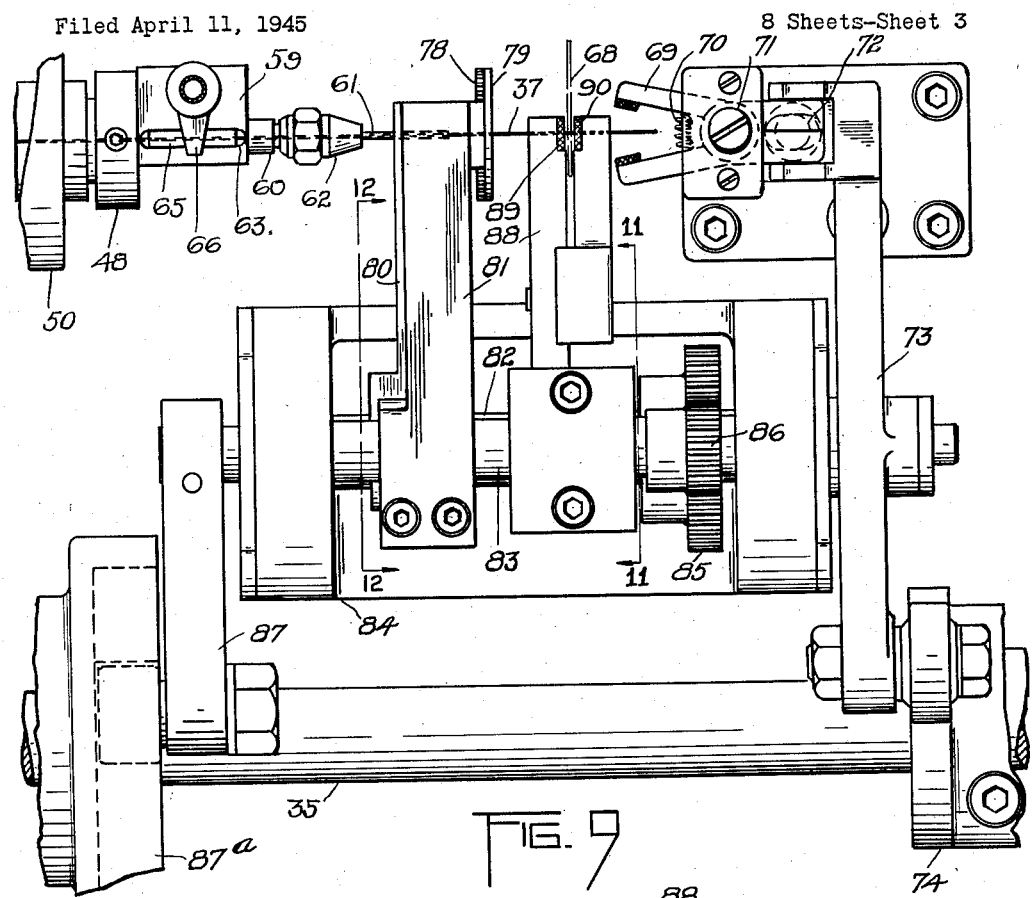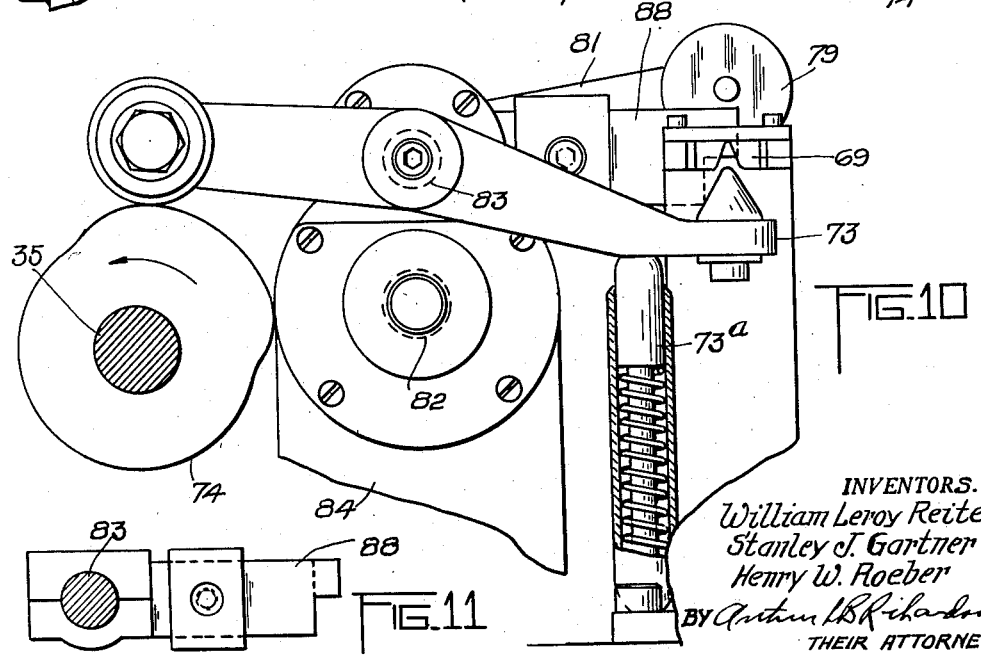

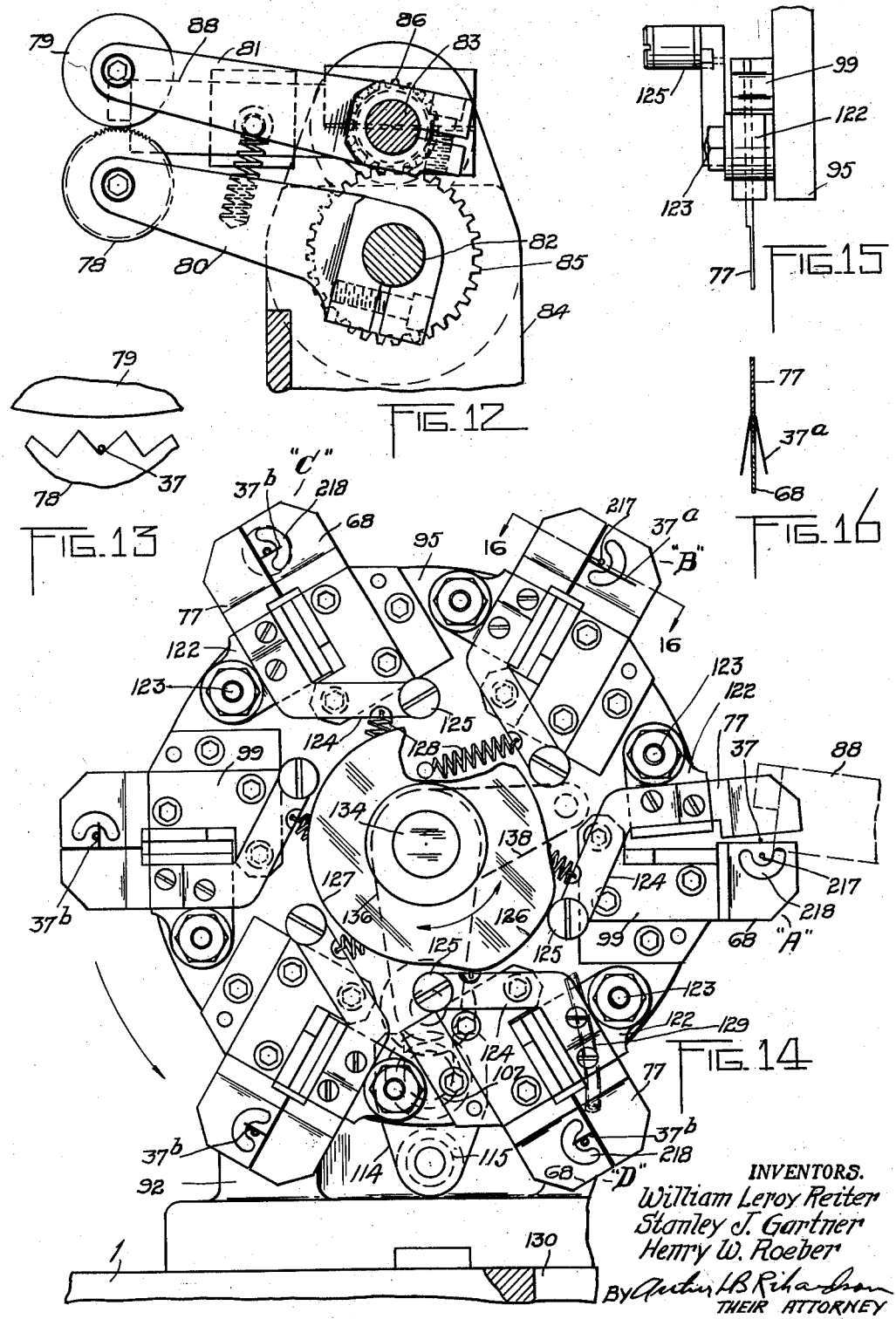

Feb. 10, 1959 W. L. REITER ET AL 2,872,949
TENSION SPRING MACHINE
Filed April 11, 1945 8 Sheets-Sheet 5

INVENTORS.
William Leroy Reiter
Stanley J. Gartner
Henry W. Roeber
BY
THEIR ATTORNEY

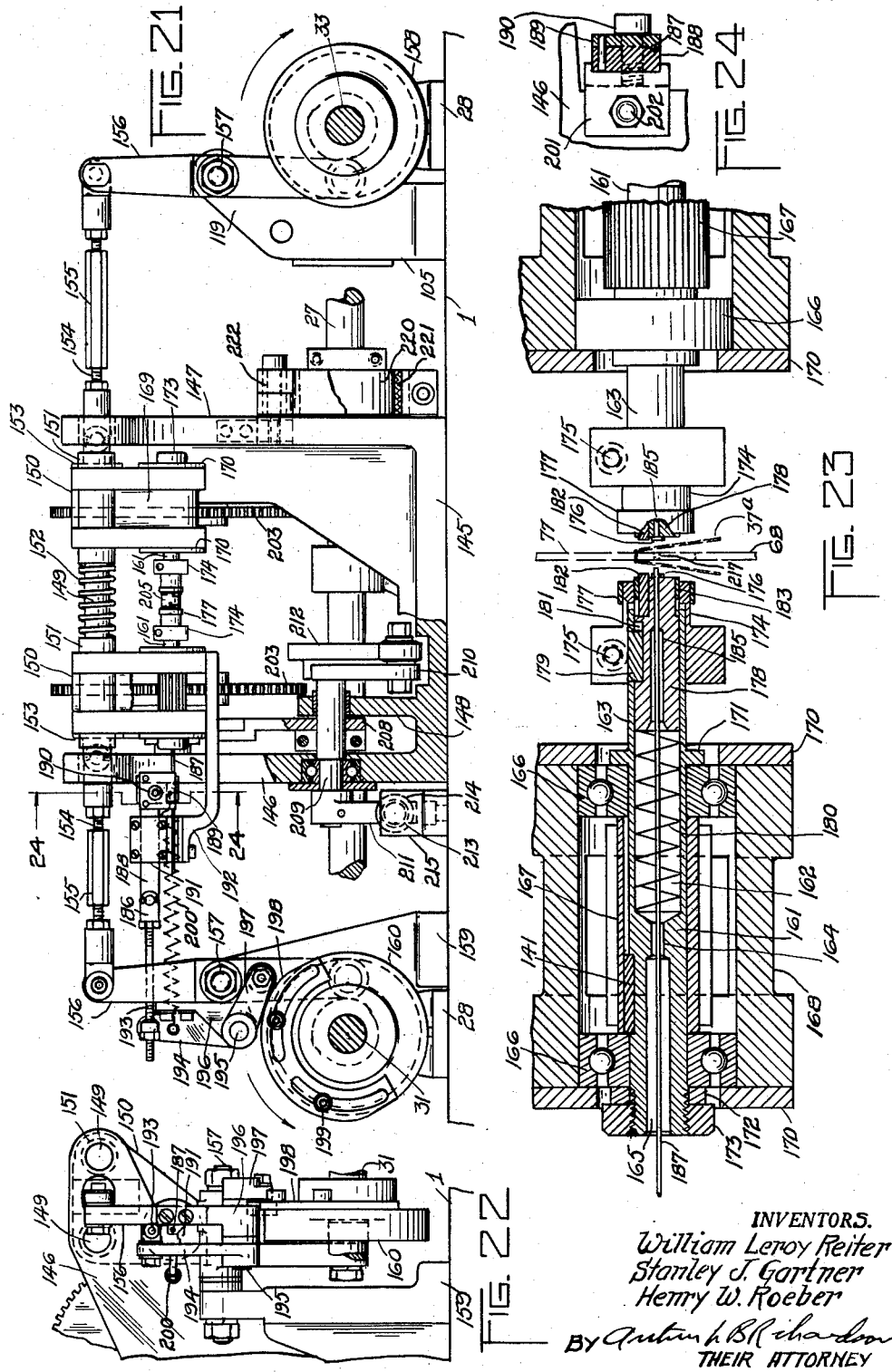

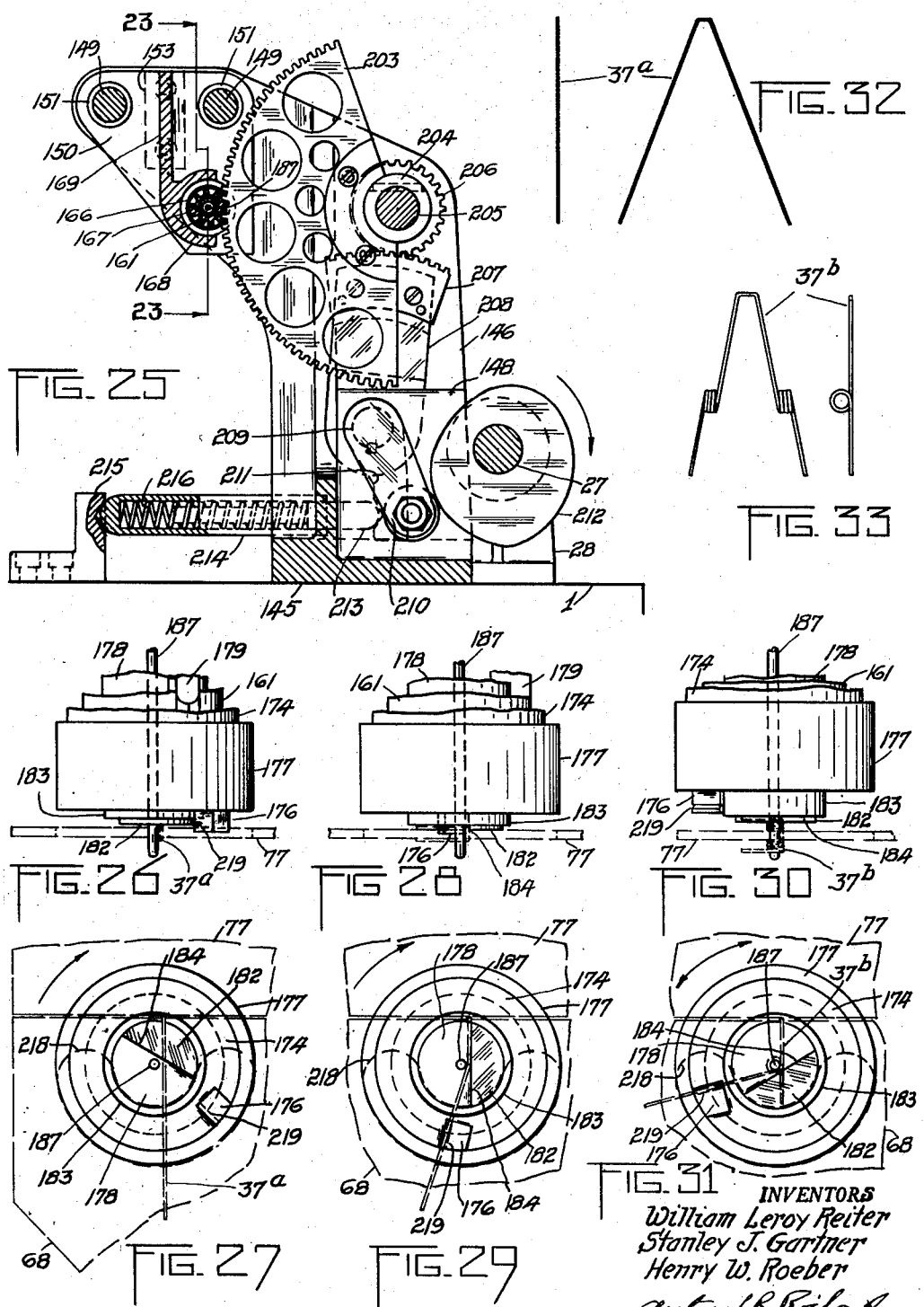

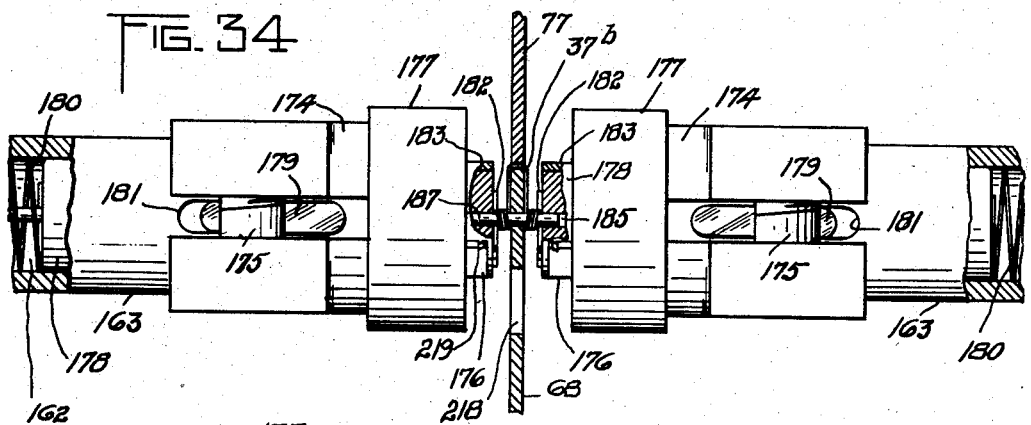
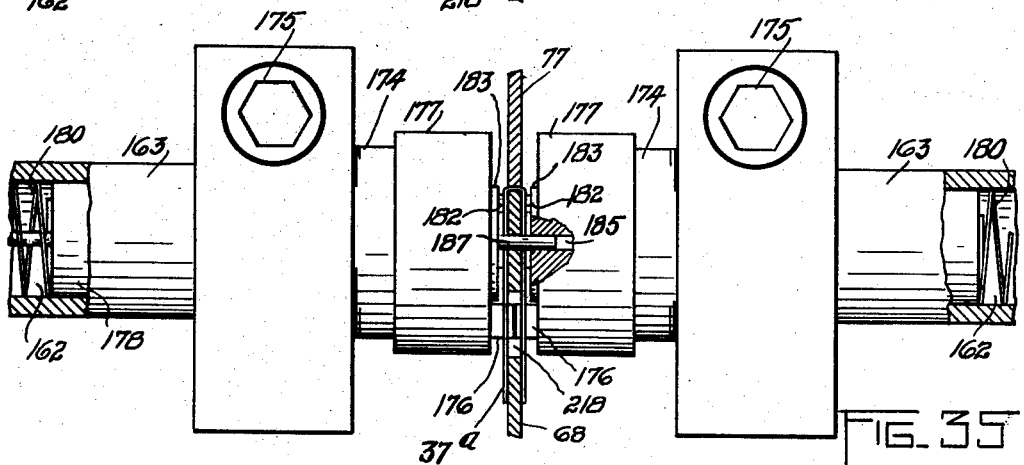
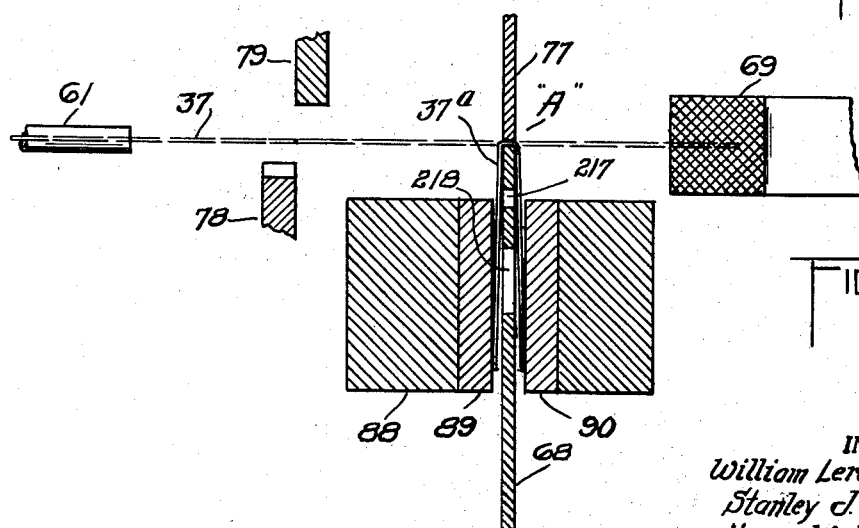

United States Patent Office 2,872,949
Patented Feb. 10, 1959

2,872,949

TENSION SPRING MACHINE

William Leroy Reiter, Stanley J. Gartner, and Henry W. Roeber, Emporium, Pa., assignors to Sylvania Electric Products Inc., Emporium, Pa., a corporation of Massachusetts Application April 11, 1945, Serial No. 587,674

34 Claims. (Cl. 140—71)

The present invention, while relating to wire forming and coiling devices in general, has more especial reference to a machine for making a particular type of spring hook used in radio tubes and the like as a tensioning support for one end of the filament and to a method of forming a spring.

This supporting hook, or so-called tension spring, is made of very fine, hard wire, preferably tungsten of from .0035" to .0045" in diameter. It is first cut to the desired length then bent U-shape to provide side legs and a connecting portion, such legs in a subsequent operation being formed at substantially midway of their length with tightly wound coils of a predetermined number of turns.

To our knowledge the only means of making this type of spring heretofore has been by manually operable devices, the work being not only too slow and costly, if quantity production were to be maintained, but very tedious, causing eye strain due to the minuteness of the workpiece, and resulting in a variable degree of accuracy in the work itself.

To improve the aforesaid slow and otherwise objectionable method of production is the principal object of our invention, and it is a further object to accomplish this end by a fully automatic machine having rapid production and in which the cooperating parts function in a manner to produce a perfectly formed spring with uniform accuracy.

Another object of our invention is to make provision whereby the diameter of stock used, size of the spring and number of turns in the coils may be varied.

Still another and important object of the invention is a feeding arrangement positive in operation, in that the exact length of wire for a spring will be advanced the required distance during each feeding movement, but having such flexibility that the wire is not subjected to any breaking strains.

A further object of the invention is the provision of gripping jaws that, when the wire has been fed into position for the first forming operation, will continue as the work holding means until all operations have been completed.

Such first operation consists in cutting the wire and practically simultaneously therewith bending it over a comparatively thin, flat arbor into substantially an inverted U, and a further object of the invention is to also employ this arbor as one of the said gripping jaws and, in addition, as the supporting plate against which the legs of the spring are held while the coils are wound.

A further object is the provision of a novel pair of cutting disks that, although shearing tungsten wire, will effect a clean cut, permit quick adjustment, and require but minimum attention in being maintained in proper condition.

The machine embodies a plurality of the aforesaid work holding units which are progressively advanced from one station to another, thus permitting a number of springs to be passing through the machine in various stages of completion, and a still further object of the invention is a combined, positively acting and accurately timed intermittently operable feed and indexing mechanism for this purpose.

Another and very important object of our invention is, bearing in mind the fineness of the wire, its texture and resiliency, the provision of means that will unfailingly engage the legs of the springs, wind them about a mandrel to form tight and otherwise perfect coils and then act to permit a sufficient spring back of the wire to allow easy withdrawal of the mandrel and ejection of the springs from the then separated gripping members, such ejection of the work being accomplished by the impingement of a jet of compressed air.

And still another object of the invention is the construction of a machine in which the operating mechanism is compactly arranged, visible to the operative, and readily accessible for the purpose of adjustment and substitution of parts.

To these and other ends our invention consists of certain parts and combinations of parts as will be fully set forth in the following description and particularly defined in the appended claims.

The accompanying drawings illustrating our invention and forming a part of the specification are as follows:

Figs. 3 and 4 are top plan and front elevation, respectively, of the wire feeding mechanism, parts being broken away in both views to more clearly show details of construction.

Fig. 5 is a sectional view as on line 5—5, Fig. 3.

Fig. 6 is a view from the left on the cam actuated arm seen in Fig. 4.

Fig. 7 is a sectional detail as one line 7—7, Fig. 3.

Fig. 8 is an enlarged sectional detail taken on line 8—8 of Fig. 4.

Fig. 9 is a top plan view, actual size, of the feed fingers, the forming and cutting devices with their operating means and showing, also, a portion of the feeding mechanism in its forward position.

Fig. 10 is a side elevation as viewed from the right with respect to Fig. 9.

Fig. 11 is a sectional detail as on line 11—11, Fig. 9.

Fig. 12 is a sectional view as on line 12—12, Fig. 9, showing the cutting disks and operating connections.

Fig. 13 is a greatly enlarged fragmentary detail of the cutting disks.

Fig. 14 is a full size face view of the turret as viewed from the left with respect to Fig. 1.

Fig. 15 is a top plan view of one of the work holding units seen in Fig. 14.

Fig. 16 is a sectional detail on line 16—16, Fig. 14.

Fig. 21 is a sectional view through the machine as taken on line 21—21 of Fig. 1, but drawn to a larger scale.

Fig. 22 is an end view of parts seen in Fig. 21.

Fig. 23 is a fragmentary view of the coil winding mechanism seen in Fig. 21, but drawn to a still larger scale, and with parts shown in section as on line 23—23, Fig. 25.

Fig. 24 is a sectional detail taken on line 24—24, Fig. 21.

Fig. 25 is an enlarged sectional view as on line 25—25, Fig. 1.

Figs. 26 and 27 are greatly enlarged fragmentary top plan and end views, respectively of one of the coil winding heads and showing the approximate relative positions of the wire engaging projections at the start of their operative movement.

Figs. 28 and 29 are views similar to Figs. 26 and 27 but showing the wire engaging means in a more advanced position of rotation.

Figs. 30 and 31 are, likewise, views similar to Figs. 26 and 27 but showing the wire engaging means advanced to the position at which the leading wire engaging member is retracted from the plane of the work holding plate.

Fig. 32 shows in side and front views the spring after the forming operation, the scale being approximately four times actual size.

Fig. 33 shows the completed spring in front and side views, the scale being approximately eight times actual size.

Fig. 34 is a fragmentary showing in elevation, as viewed from the front of the machine, of the winding heads with their respective parts in the relative positions they assume at the completion of the coil winding operation. This view is drawn to the same enlarged scale as Figs. 30 and 31 with the wire engaging members in approximately the same angular positions as seen in those figures.

Fig. 35 is a view similar to Fig. 34 but showing the respective parts of the winding heads in their relative positions at the start of the coil winding operation which is with the wire engaging members approximately in the positions illustrated in Figs. 26 and 27.

Figure 1:
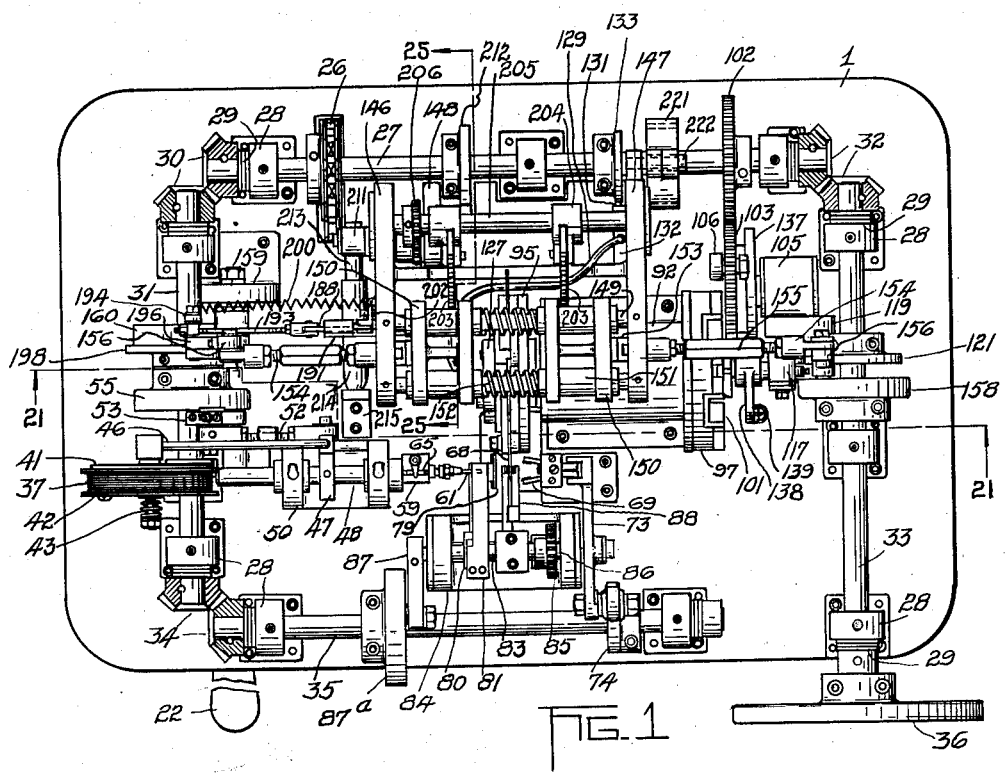
Fig. 1 is a plan view of the machine with miter gears on the cam shafts shown in section and with the housings for such gears removed.
Figure 2:
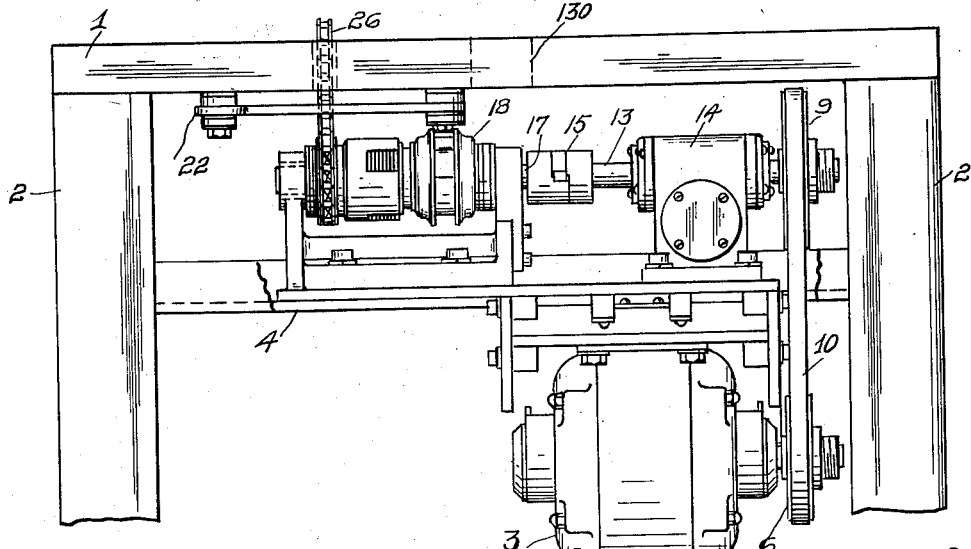
Fig. 2 is an enlarged view in front elevation of the driving mechanism.

And, Fig. 36 is a similarly enlarged front elevation of the work piece at completion of the forming operation, this view being a somewhat diagrammatic illustration and with parts shown in section as on a vertical plane through the line of feed of wire from the supply reel.

In Figs. 35 and 35 parts are broken away to more clearly show features of construction and operation.

In the drawings similar reference numerals refer to similar parts throughout the several views.

The support for the operating mechanism is shown as the top 1 of a table having legs 2. Power is derived from an electric motor 3 mounted underneath the table upon suitable frame work 4. Pulleys 6, 9 and belt 10 afford driving connection from the motor shaft to the shaft 13 of a speed reducing unit 14, such shaft having connection through coupling 15 with the main drive shaft 17 on which a clutch 18, manually controlled through lever 22, is operated to engage and disengage the driving sprocket wheel of a chain drive, indicated generally by the numeral 26, whereby the shaft 17 is geared to a shaft 27 arranged above the table top 1.

The shaft 27 is, in this instance, the rear, longitudinally extending one of a plurality of rectangularly arranged cam shafts journalled in bearing blocks 28 and provided with end thrust bearings 29. Shaft 27 has driving connection through a pair of bevel gears 30 with one transverse shaft 31 and likewise at 32 with the other transverse shaft 33, shaft 31 having similar bevel gear connection 34 with the shorter longitudinal shaft 35, while the shaft 33 at its forward end carries a hand wheel 36 whereby the several shafts may be turned to effect proper relative adjustment of the cams mounted thereon and later to be described.

Referring now to Figs. 1 and 3 to 8, inclusive.

The reel from which the fine wire 37 for the tension springs is fed may be of any preferred type but, in this instance, is shown as a spider in the arms 38 of which are anchored the inner legs of U-shaped springs 39 arranged in radial planes and with the slightly convexed outer leg of each spring engaging over the peripheral surface of its respective arm and extended into an aperture 40 on a peripheral flange part 41, thereby permitting a flexing of the spring while holding it against displacement. The wire 37 is contained within the annular channel of an outwardly flanged rim 42 which is slipped over the springs 39 against the abutment 41 and thus yieldingly held in place.

The reel is mounted on a stud 43 and held against turning too freely by the adjustable braking action of a compression spring 44 interposed between the reel and an adjusting nut 45 on the stud. This stud 43 projects laterally from the outer end of an arm 46 extending upward and then horizontally to the left, with respect to Figs. 1, 3 and 4, from a carriage block 47 mounted on a tubular member 48, and fixed thereto in a position of adjustment axially of such member by a set screw 49. This tubular member, block, reel and its supporting arm comprise a carriage adapted for reciprocating movement and, to this end, the tube is mounted to slide axially in the upstanding arms of a U-frame 50, the block being further held against angular displacement by straddling a guide bar 51.

Reciprocation of the carriage is effected by an adjustable link 52 pivotally connected at one end to the block 47 and at its other end to a lever 53 mounted for oscillating movement on a fixed frame part 54 and having a follower travelling in the groove of a face cam 55 on shaft 31. The connection of link 52 to the lever 53 is adjustable lengthwise of the lever through the medium of a nut 56, to which the link is directly pivoted, and its adjusting screw 57.

The axial bore through the tubular member 48 terminates in the progressively reduced smaller bore of a short inner sleeve 58 extending into the forward or right hand end of such member as a fixed support for an end block 59 from the opposite face of which there is an opposing, externally threaded extension 60 having an axial opening aligned with that in the sleeve 58 for receiving a tube 61 of small diameter which acts as a guide and support for the free end of wire 37. This feed tube is retained in a fixed position of axial adjustment by the gripping action of a collet 62 threaded on the extension 60.

Wire 37 is threaded from the reel through the member 48 thence through the feed tube 61 and projected therefrom so as to be gripped by the feed fingers as will be described. In the block 59, in line with the feed tube, is a milled slot 63 bottomed in a plane tangential to the bottom of the tube's inner diameter to provide a bearing surface 64 against which the wire is yieldingly held by a pad 65 guided in said slot and held down by a finger 66 under the adjustable pressure of a compression spring 67, as clearly shown in Fig. 7. Thus there is provided a friction clutch whereby the unreeled length of wire is caused to travel forward with the carriage, the projecting portion of the wire being moved over the forming edge of an arbor 68 comprising the fixed lower one of a pair of then opened wire gripping jaws.

On completion of the forward movement of the carriage, the wire 37 adjacent its end is gripped between the free ends of a pair of fingers 69 normally held open by spring 70 and pivoted intermediate their ends at 71 to a fixed support, as is illustrated in Fig. 9. These fingers are positively closed on the work by a tapered wedge 72 engaging between their other ends and carried on the inner end of a cantilever 73, the outer end of the lever carrying a roller which, see Fig. 10, under action of a spring pressed plunger 73a engaging the lever in advance of its fulcrum, follows a cam 74 on shaft 35. The fingers 69 grip the wire during return movement of the carriage and thus effect an unreeling of the wire against action of the friction clutch 65 and the resilient brake applied to the reel.

The length of feed is determined by adjustment of the link 52 on lever 53 and the corresponding adjustment of the link itself. And, as a positive means for insuring an exact feeding of the wire, thus overcoming the possibility of any slight springing of the carriage parts which would result in an excessive length or shortage, adjustable stop screws 75 are provided in the side arms of the frame 50 which, in the forward and return movement of the carriage, are engaged by the respective ends of a fixed stop pin 76 on the carriage block 47, as is shown in Fig. 4.

Completion of the return movement of the feed carriage finds the wire 37 held against the edge of the aforesaid arbor 68 by the opposing movable member 77 of this particular pair of jaws and whereby the work piece is held during the subsequent forming and coil-winding operations, the feed fingers 69 now being opened.

Following the just above-mentioned gripping of the work, the wire is sheared by a pair of disk cutters 78 and 79, referring to Figs. 9 to 13 inclusive and 36. These cutters are mounted for rotary adjustment on the inner ends, with respect to the machine, of substantially parallel arms 80 and 81, respectively, the arm 80 at its outer end being secured in a desired position of both angular and axial judgment on a shaft 82 while the arm 81 is likewise secured in position of angular and axial adjustment on a shaft 83 paralleling the shaft 82 and both being journalled in the side arms of a frame member 84, the upper shaft 83 also providing pivotal mounting for the feed finger lever 73. Fixed to the shaft 82 is a spur gear 85 which drives a smaller gear 86 fixed to the shaft 83 and these shafts are given a rocking motion to move the cutters into and out of engagement by the oscillation of an arm 87 pinned to a projecting end of shaft 82 and carrying a roller which follows the channel in the side face of a cam 87ª on shaft 35. Arm 81 carrying the top cutter 79 travels through a greater arc than the arm 80 because of a substantially two to one ratio of the gears on their respective shafts.

The cutter 78 has its peripheral face serrated to form regularly spaced transverse ridges and grooves. Wire 37, when being cut, lies in the one of these grooves aligned with the feed tube 61, the diverging side edges of the groove tending to hold the wire against bending laterally and acting as two points of a three-point engagement with the wire of the cutting knives as the wire is severed. Should the edges of one groove become dull the cutter 78 is adjusted to bring another groove into operative position. In sharpening these cutters it is only necessary to remove them and grind their side faces.

Also angularly adjustable on the shaft 83 is the longer one of a pair of arms secured together and comprising a forming tool 88, see Fig. 9, bifurcated at its operating end so that the work engaging hardened faces 89 and 90 bend the wire U-shape by forcing the thus formed legs against the side faces of the arbor 68 which, as will be observed, is with its cooperating wire holding jaw 77, straddled by the forming tool, the latter being timed to function practically simultaneously with but slightly after the cutters.

From the foregoing it will be observed that a reel on which the supply wire is wound is moved forward and back by reciprocation of a carriage upon which the reel is mounted to rotate under adjustable spring tension; that the portion of wire leading from the reel is threaded through a restricted opening extending in the direction of the carriage movement, thence through a friction clutch and a guiding tube movable with the carriage; that the free end of the wire, at the completion of such forward movement, is gripped by a clutching means and the wire caused to unwind from the reel under tension as the carriage movement is reversed; that the portion of wire to be cut off is then gripped midway of its ends by a pair of jaws lying in a plane transversely of the wire; and that operating in unison from a common actuating source, but with one slightly in advance of the other, are means, as a pair of disks, for cutting the wire and a forming tool which straddles the said gripping jaws and cooperates with one of them functioning as an arbor to bend the wire U-shape.

Although the machine, as so far described, may be made to accommodate various sizes of wire within certain limitations and geared to run at any desired speed, it may be stated that the illustrated embodiment of the invention is designed for wire of .0035" diameter and that the time interval for completion of the operations named is but slightly more than one second.

To the end that a number of springs may be in simultaneous progress through the machine with different operations being performed during a predetermined time interval, and that a completed spring will be ejected after each functioning of the hereinabove described mechanism to cut and form the wire, we provide a plurality of arbor blades 68, in this instance six, with one of them positioned for cooperation with the forming tool at each operative movement of the latter. These arbors are carried by a turret which with its indexing, locking and operating means is illustrated in Figs. 1 and 14 to 20, inclusive, and now to be described.

Figure 19:
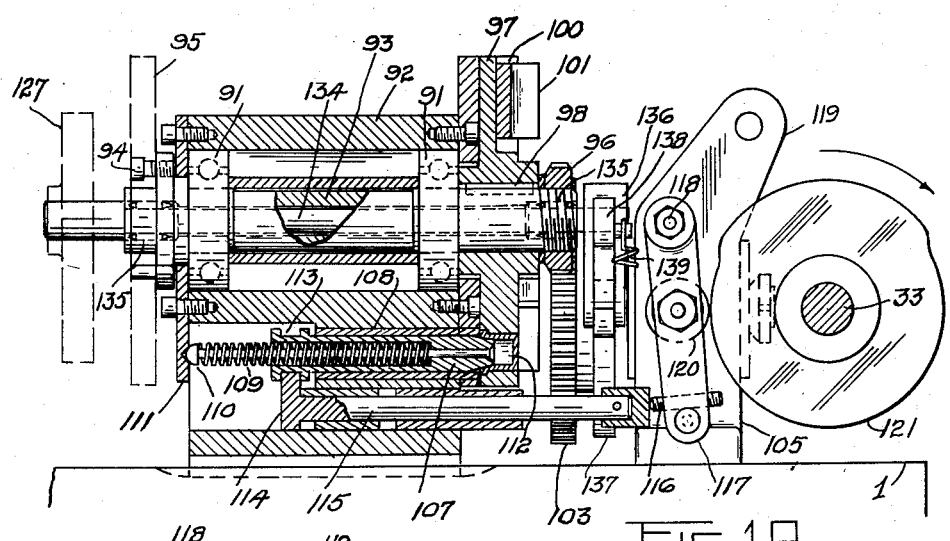
Fig. 19 shows the indexing mechanism partly in side elevation and partly in section as on line 19—19, Fig. 17.
Figure 20:
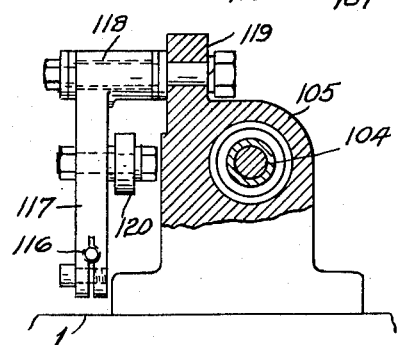
Fig. 20 is a sectional detail on line 20—20, Fig. 18, but showing some of the parts in elevation.

Parallel with the cam shaft 27 and mounted on antifriction bearings 91 in a housing 92 secured to the table top 1 is a hollow shaft 93 to the flanged left end of which, Fig. 19, is attached in any suitable manner, as by screws 94, a head plate 95 which carries the arbors 68. The opposite end of shaft 93 is externally threaded to receive a nut 96 between which and the adjacent end wall of the housing is an indexing plate or head 97 having a hub portion to which shaft 93 is splined by a key 98.

Rigidly secured to the outer side face of the head plate 95, or turret proper, are a plurality of regular spaced, circumferentially arranged reinforcing holders 99, see Fig. 14, to which in turn are secured the fixed members 68 of the gripping jaws. These members project beyond the periphery of the head 95 and their projecting portions are ground down to form the thin, flat-faced arbors over which the wire 37 is bent by the forming tool 88, the top edge of each such plate, and on which the wire rests, being coincident with a radial line from shaft 93.

Figure 17:
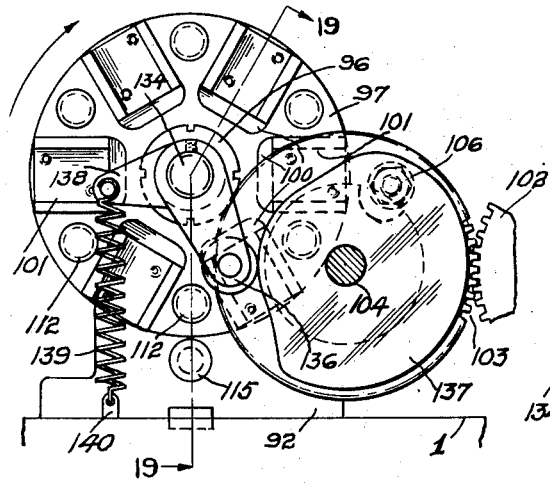
Fig. 17 is a face view from the right, with respect to Fig. 1, showing the indexing end of the turret but drawn to a smaller scale than Fig. 14.
Figure 18:
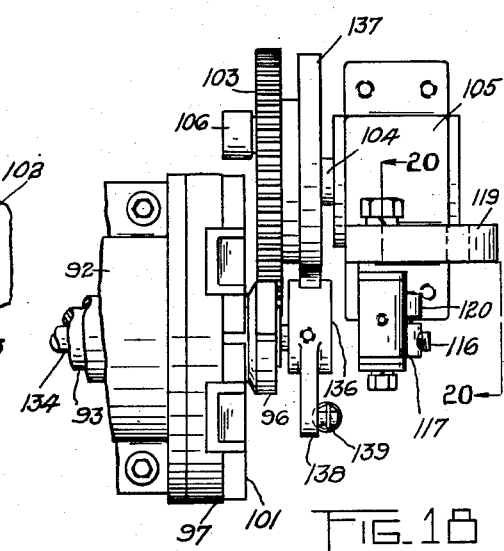
Fig. 18 is a top plan view of parts seen in Fig. 17 but as turned at right angles thereto.

In order to rotate the head plate 95 through the shaft 93, the indexing head 97 is provided with recesses 100 into which are secured a plurality of radially extending channel blocks 101, these blocks being the same in number and having like angular spacing as the gripping units on the turret head 95, see Figs. 17 and 19. They constitute means by which the indexing head is geared for intermittent rotary movement.

Fixed to the shaft 27 is a spur gear 102 which drives a similar gear 103 of like pitch diameter fixed to a short shaft 104 journalled in a bearing block 105. This gear 103 carries a roller 106 which, on each complete rotation of the gear, enters the outer end of successive channels in blocks 101, thus becoming geared thereto, and is so relatively positioned as to leave said channel when the head 97 has been advanced through an arc, in this instance, of 60°. Thus, for each complete rotation of the gears 102 and 103 the head 97 and likewise the turret head 95 have been given a rotary movement of 60° and a time interval of rest.

In order to obtain an exact indexing of the turret and to hold it positively locked and against vibration during the intervals of rest, a plunger or locking pin 107 is guided for axial movement in a bushing 108 fitted to a bore in the housing 92 parallel with shaft 93. This plunger is recessed to receive a coiled compression spring 109 encircling a rod 110 and interposed between the bottom of such recess and a fixed part 111 of the housing, this spring functioning to force the plunger forward so that its tapered end will enter one of six regularly spaced, circumferentially arranged recesses in the inner side face of the indexing head, see Fig. 19. Preferably these recesses are inwardly opening ground and hardened cup bushings 112 fitted to reamed holes in the head 97 and into which the plunger enters as they are intermittently advanced to successively register with the plunger.

The rear end of the locking pin 107 projecting beyond the sleeve 108 is enlarged and formed with an annular groove 113 for receiving the flanged end 114 of a rod 115 guided for reciprocating movement in the housing 92. This rod, with the locking pin or plunger 107, is moved forward by action of the spring 109 and is positively moved in the reverse direction against the action of such spring, and to disengage the plunger from locking engagement with the head 97, by the contact with its forward end of a screw 116 adjustable in the lower, free end of an arm 117 pivoted at its upper end at 118 to a bracket 119 carried by the bearing block 105, this arm being moved against the action of spring 109 by a roller 120 thereon which follows a cam 121 on shaft 33.

With further reference to the turret head 95, it will be observed that each arbor plate 68 constitutes the fixed one of a pair of relatively movable jaws or work gripping units, the movable member 77 having its portion projecting beyond the periphery of the head 95 substantially similar in shape and thickness to the corresponding part of the member 68 and lying in the same plane therewith, its central portion being secured to a holder 122 pivotally mounted at 123 to a side face of said head and having an angularly disposed inner arm 124 on the end of which is a roller 125, as is shown particularly in Figs. 14 and 15. This roller is engaged by the peripheral part or cam surface 126 of a cam 127 and swung to open position against the action of a tension spring 128, such spring normally acting to hold the jaw closed and being anchored at one end to the arm 124 and at its other end to a fixed pin in the head 95. The cam has an oscillating movement, turning anti-clockwise, Fig. 14, to open the jaw 77 when its respective arbor member 68 is indexed to the position, indicated at A in Figs. 9, 14 and 36, for receiving the wire 37 from the feeding unit. The movement of cam 127 is then clockwise to permit closing of the jaw against the work, whereupon the latter is engaged by the forming tool 88, and to open the jaw 77 of the next succeeding gripping unit then at station D, Fig. 14, to permit the finished spring, indicated at 37b, being blown from an arbor 68 by the impingement of a jet of air directed against it from an air tube 129, shown in broken lines in Fig. 14, the spring dropping through an opening 130 in the table 1 into any suitable receptacle. From the loading or first station A to the unloading position or station D of the turret, as just above described, the jaws 77 of the gripping units remain closed against the work. In other words, and again referring to Fig. 14, the wire bent U-shape, as at 37a, is retained in such condition at the second station B which is an idle station and the first one in advance of the loading station. At the third station, indicated in Fig. 14 at C, the jaws grip the work while the coiling means, which will be described hereinafter, is functioning at such station to form the completed spring 37b. At the fourth and fifth stations, intermediate positions of the turret at which no operations on the work are performed, the jaws remain closed on the work and, also, at the sixth or unloading station D until the gripping unit then at the loading station A has closed on a new piece of wire 37, after which cam 127 moving in a clockwise direction opens the jaws at station D to release the spring 37b at which the air jet is then directed. The air line 129 leads from any suitable source of compressed air supply and interposed in the line is a valve 131 operating in a housing 132 and closed by any preferred means but opened by contact therewith of a cam 133 on shaft 27.

Cam 127 just above referred to is fixed to the projecting inner end of a shaft 134 extending through the hollow shaft 93 and mounted to rotate independently thereof on needle bearings 135 carried by shaft 93, see Fig. 19. On the other end of shaft 134 is a bell-crank lever, one arm 136 of which carries a follower engaged by a cam 137 on the shaft 104 of the gear 103, while hooked to the other arm 138 is one end of a tension spring 139 which at its other end is anchored to an ear 140 on the table 1. Thus a rocking of the bellcrank to cause oscillation of cam 127 is effected in one direction by the cam 137 and in the other by reaction of the spring 139.

The construction and operation of the coil-winding mechanism is as follows:

Secured to the table top 1 in front of cam shaft 27 is a base plate 145, as will be seen in Fig. 21, and formed integrally therewith are upstanding arms 146 and 147 spaced apart longitudinally of the machine and between which but nearer the arm 146 is an intermediate wall 148 of less height than the arms. These arms have overhanging portions extending toward the front of the machine and connected by a pair of tie rods 149 lying in a horizontal plane. The rods are a supporting guide for two carriers 150 in each of which is rotatably mounted a coil-winding means later to be described.

Preferably, the carriers are provided with elongated tight-fitting bushings 151 and interposed between opposing ones of these bushings are coiled compression springs 152, see also Fig. 1. On the outer face of each carrier is a plate 153 to which is pivotally connected the inner end of a link 154 adjustable by a turnbuckle 155, the outer end of the link having pivotal connection with the upper end of a substantially vertically extending lever 156 pivoted intermediate its ends on a stud 157. Such stud, for the right-hand lever, Fig. 21, is carried by the bracket 119 which also supports the pivoted arm 117, and on the lower end of this lever is a follower engaging in the channel of a face cam 158 on shaft 33. And, stud 157 or lever 156 at the left in Fig. 21 is mounted in a bracket 159, the lower end of this lever having a follower engaging cam 160 on shaft 31, these cams 158 and 160 being similar but in opposed relation. Rotation of the cams effects a simultaneous movement of the opposing carriers 150 toward and from each other, the compression springs 152 functioning to cushion such carrier movement by keeping the cams loaded, so to speak, and absorbing any possible vibration.

Extending through each carrier 150, parallel with the guide rods 149 but in a lower plane, is a shaft 161. These shafts, from their opposing inner ends which project beyond their respective bearing members 150, each have a deep bore 162 of comparatively large diameter whereby the shaft for a substantial part of its length has a rather thin wall constituting a sleeve portion 163. Such bore terminates in a short axially extending aperture 164 of greatly reduced diameter which, at its other end, terminates in a counter-bore 165 in the other end of the shaft.

As is illustrated in the enlarged view of Fig. 23, each such hollow shaft 161 is rotatably mounted on spaced ball bearings 166 between which and splined to the shaft by key 141 is a spacer comprising an elongated pinion 167 partly housed in the semi-circular shield 168 forming an integral portion of a vertically disposed web 169 connecting the end walls of the carrier 150. End plates 170 on the carrier retain the outer races of the ball bearings while the inner races are engaged on their outer faces, one by an annular shoulder 171 on the shaft and the other by a washer 172 interposed between it and a nut 173 on the threaded outer end of the shaft, whereby the shaft is held against axial movement in the bearings.

A split sleeve 174 is clamped over the forward or inner end, part 163, of each shaft 161 by a screw 175 and comprises an adjustable extension for the shaft. This extension is provided with an axially extending segmental projection or tooth 176 which, preferably, is the outer end of a hardened insert set in a recess in the part 174 and held in place by a pressed-on ring 177, the projection 176 in its rotary movement engaging a leg of the U-formed wire 37a in the manner to be hereinafter described, see Figs. 26 to 35.

Slidable within the sleeve end 163 of each shaft 161 is an inner coil-winding member comprising a plunger 178 splined to the sleeve portion by a key 179, see Fig. 23, but movable axially a short distance relatively of the shaft by action of a light, coiled compression spring 180 placed behind the plunger in the bore 162. This member 178 is normally held in its foremost position, which is with its end slightly in advance of the sleeve extension 174, the length of relative axial movement of the inner and outer members 178 and 161, respectively, being the excess in length of the key slot 181 over the key 179.

This slidable inner member or plunger 178 is provided on its end face with an axially extending segmental projection but of less depth than the projection 176. This projection is, also, preferably formed by a hardened insert 182 fitted to the cut away, reduced end of the plunger over which is pressed a retaining ring 183. And, the wire engaging edge or shoulder 184 of the projection is spaced radially from the periphery of an aperture 185 in the member 178, a distance slightly in excess of the diameter of wire 37, this aperture extending through the member 178 coaxial with the shaft 161.

Extending axially through one of the winding shafts or heads 161, in this instance the left with respect to Figs. 1, 21, 23 and 26 to 35 inclusive, is a mandrel 187 having its forward end normally projecting slightly beyond the operating end of such head and being axially movable with and also independently of its respective carrier 150. In the desired position of axial adjustment, the mandrel, guided at its forward end in the reduced portion of aperture 185, is clamped adjacent its other end to a horizontally disposed bar 188 by a plate 189 and screw 190, see Fig. 24. The bar is guided for sliding movement in the head end 191 of a bracket 192 supported by the carrier 150 and has pivotal connection with a clevis 186 which with a threaded rod 193 forms an adjustable link connection with the upper end of an arm 194. The other end of this arm is fixed to a stud 195 mounted for rocking movement in a bearing block 196 attached to the lever 156 actuated by cam 160. Rocking of stud 195, in one direction, is effected by another arm 197 fixed thereto which carries a follower engaged by a cam 198 secured for rotary adjustment by screws 199 to a side face of cam 160 and, in the other direction, by a tension spring 200 anchored at one end to the arm 194 and at its other end to the frame part 146. Also secured to sliding bar 188 is an angle plate 201 in which is an adjustable stop screw 202, adapted to engage the fixed upright 146 and thus limit inward movement of the mandrel.

In order to rotate the coil winding heads, the pinions 167, see Fig. 25, are rotated in unison at highly accelerated but variable speeds by segmental gears 203 clamped to flanged portions of sleeves 204 pinned to a shaft 205 rotatably mounted in the uprights 146 and 147, these pinions at the same time moving transversely of their driving gear segments as the carriers 150 are reciprocated on the guide rods 149. Shaft 205 is rocked through the medium of a spur gear 206 fixed thereon which is driven by a gear segment 207 secured to an arm 208 carried by a short shaft 209 journalled in upright 146 and the wall member 148. This shaft 209 has two arms 210 and 211 keyed thereto, the arm 210 carrying a follower engaging a cam 212 on shaft 27 and held in contact therewith, so that a rocking of the shaft is effected, by engagement of the arm 211 with a plunger 213 slidable in a floating tubular housing 214 flexibly contacting a fixed frame part 215 and containing a compression spring 216 acting against the plunger.

Operation of the coil winding devices is as follows:

First it will be observed that each arbor blade 68 is pierced at 217, adjacent its top or wire supporting edge, and that concentric with such aperture is an arcuate slot 218 of approximately 180°. Furthermore it will be observed that the wire 37 is so held by each gripping unit comprising an arbor 68 and its movable jaw 77 that, when the wire is bent U-shape, as at 37a, the side legs will lie in back of the aperture 217, with respect to the turret, but in juxtaposition thereto, as is shown in Fig. 14 at station B and in Figs. 27, 29, and 31.

The shafts 161, or coiling heads as they may be termed, oppose each other and are spaced with their inner ends equidistant from and at right angles to the plane of the work holding unit with which they are to cooperate and with the turret so indexed and positively locked that the aperture 217 in jaw member 68 of the holding unit will be in axial alignment with the mandrel 187.

In movement of the carriers 150 toward each other to bring the coiling heads into operative position, the inner head members 178 first engage the legs of the work piece 37a and, acting under pressure of the springs 180, yieldingly hold them against their respective sides of the blade 68, as indicated in Fig. 35. At this time the mandrel 187 has been projected through the opening 217 a short distance into the restricted end of the aligned opening 185 in the opposing member 178 thus providing a common mandrel for both heads and around which both coils of the spring are formed. Continued forward movement of the heads effects a relative axial movement of the inner and outer rotating members 178 and 161, the inner members 178 remaining in yielding contact with the wire against the blade 68 while the outer members 161 are advanced until their end projections 176 enter the arcuate slot 218 and stop just short of abutting each other, as also indicated in Fig. 35.

This axial positioning of the heads, it may here be stated, occurs during a split second time interval when an approximate 10° dwell on cam 212 momentarily stops rotation of the heads at just the time direction of rotation is to be reversed.

Projections 176 enter the slot 218 at approximately the relative positioning thereto indicated in Fig. 27. The relative fixed angular arrangement of the projections or tooth inserts of the outer and inner rotating members is such that the wire engaging edge of each head projection 176 is set a few degrees in advance of the wire engaging edge or shoulder 184 of the inner winding member.

In advancing angularly to the position shown in Fig. 29, the projections 176, see Fig. 35, positively engage their respective legs of wire 37a, force them tightly against mandrel 187 and start winding the coils. In this position the end face of each segmental projection 182 passes off the wire, whereupon the inner member 178 slips slightly forward under action of spring 180 so that the wire engages between the mandrel and the shoulder 184.

In movement of the parts to the respective positions shown in Fig. 31 the wire may be engaged by both the projections 176 and shoulders 184. At substantially this position the carriers 150 and with them the shafts 161 are retracted sufficiently to permit the projections 176 being withdrawn from the slot 218. The spring pressed inner members remain in active operative engagement with the wire to complete formation of the coils, retracting under pressure of the springs 180 as the coils are extended in length. This pressure is such that while the coils are tightly wound the successive convolutions will not pile one upon the other. The position of the heads at the convolution of the winding operation is illustrated in Fig. 34.

Preferably the winding action is such that the legs are given substantially a one-quarter turn in addition to the number of turns in the completed spring. Rotation of the heads is then reversed, allowing a spring back of the legs to permit a loosening of the coils on the mandrel before functioning of the cams 158 and 160 to move the several parts to inoperative position. Retraction of the left hand carrier causes a like movement of the mandrel 187. The latter, however, by cam 198 and parts actuated thereby, is given additional movement to clear the completed spring 37b and permit a further indexing of the turret.

The projections 176 may have file cuts 219 to insure the wire being held in engagement therewith. The wire readily slips out of these grooves on the first retraction movement of the projections in withdrawal from the slot 218. Also, as the coils are being wound the free ends of the legs become shorter and draw out of the path of the projections 176.

While we have shown the machine as producing a spring bent U-shape with a coil formed in each leg thereof, it will of course be understood that, if the work piece is such as to require but a single coil, one of the winding heads may be eliminated.

Braking action is applied to the machine by a brake wheel 220 on shaft 27 which is encircled by a split brake shoe 221 mounted on a stud 222 in the upright frame part 147, see Fig. 21.

Successful operation of the machine is governed by the proper timing and alignment of the various parts coupled with any adjustment that may at times be necessary. And to these ends, as hereinabove mentioned, the movable parts are so arranged as to be visible to the operative and readily adjustable. The hand wheel 36 makes possible the manual rotation of shafts 27, 31, 33 and 35 for the purpose of properly setting the cams mounted thereon.

Although we have shown and described particular embodiments of our invention, we do not desire to be limited to the embodiments described, and we intend in the appended claims to cover all modifications which do not depart from the spirit and scope of our invention.

What we claim is:

1. The combination, in a machine of the character described, means for feeding a predetermined length of wire, means for cutting the wire, means for winding two coils in said wire in spaced relation to each other, means for doubling the wire upon itself at a point intermediate said coils, and a gripper for supporting said fed and cut length of wire during the operations thereon by said winding and said doubling means.

2. The combination, in a machine of the character described, wire gripping means, means for supporting said wire gripping means at a first and a second position, means for feeding a predetermined length of wire into said wire gripping means, means for cutting the wire, means at one station for doubling the wire upon itself to provide a connecting portion and side legs, rotating means at another station for winding a coil in each of said legs, said gripping means at said first named station functioning as an arbor over which the wire is bent and at the other of said stations as a support against which said legs are yieldingly held while said coils are wound, and means for effecting intermittently the movement of said gripping supporting means between said stations.

3. In a machine of the character described, wire gripping means, means for supporting said wire gripping means at a first and a second position, means for feeding a predetermined length of wire to said wire gripping means, means for cutting the wire, a forming tool at said first station for doubling the wire upon itself to provide a connecting portion and side legs, axially aligned opposing rotatable members at said second station for simultaneously coiling a portion of said legs, a mandrel common to both said rotary members and on which the coils are wound, said gripping means at said first-named station functioning as an arbor over which the wire is bent and, at the other of said stations, as a support against which said legs are yieldingly held while the coils are wound, and means for effecting axial movement of said mandrel into and out of the path of said gripping means while said gripping means is at said second position.

4. In a wire spring forming machine, gripping means for holding a work piece, means for supporting said wire gripping means at a first and a second station, means adjacent said first station for feeding a length of wire to said gripping means, a forming tool adjacent said first station for bending the wire to form a leg portion, means for moving said wire gripping supporting means to said second station, a rotatable coil forming head adjacent said second station, and means for moving said rotatable coil forming head in engagement with said gripping means to form a coil in the leg portion.

5. In a spring forming machine, gripping means for holding a work piece, means for supporting said wire gripping means at a first and a second station, means adjacent said first station for feeding a length of wire to said gripping means, a forming tool adjacent said first station for bending the wire to form a pair of leg members, means for moving said wire gripping supporting means to said second station, a pair of oppositely disposed rotatable coil forming heads adjacent said second station, and means for causing axial movement of said heads toward each other to effect engagement with the legs of the wire and for rotating said heads to form a coil in each of the legs.

6. In a spring forming machine, means for supporting a reel of wire and the unwound free end of the wire, means for moving said supporting means in one direction, means to grip the free end of the wire at the end of the movement in said direction, means for moving the reel in the opposite direction to unwind a length of wire, wire severing means, second gripping means for gripping the severed wire between a pair of jaws, and means for bending the length of wire into a substantially U-shaped section.

7. The combination, in a machine of the character described, of a carriage for supporting a length of wire and mounted for reciprocating movement, driving means for effecting such movement and including adjustable connections for determining the length of the movement, resilient means for frictionally engaging the wire to cause its travel with the carriage in one direction, means for gripping the wire at the completion of said travel and to hold it against action of said frictional engagement during travel of the carriage in the other direction, thus effecting a feed of the wire, means for cutting the wire, and a second gripping means operating in advance of the cutting means to engage the portion of wire to be severed.

8. In a machine of the character described, the combination with a carriage mounted for reciprocating movement and driving means for effecting such movement including adjustable connection for determining the length of the movement, of a reel of wire rotatably mounted on said carriage, means on the carriage for frictionally engaging the wire adjacent its free end, braking means acting on said reel to hold the wire taut, gripping means for engaging the free end of the wire at completion of the forward movement of said carriage and effecting a feeding of the wire during return movement of the carriage by holding it against action of said frictional engagement, means for cutting the wire, and a second gripping means operating in advance of the cutting means to engage the portion of wire to be severed.

9. In a machine of the character described, the combination with a frame, a carriage mounted for reciprocating movement and including a tubular member axially movable in said frame, an arm fixed to the tubular member, an extension on the forward end of said tubular member and having a bearing surface, a reel rotatably mounted on said arm so that a length of wire therefrom may be threaded forward through the tubular member, a resilient clutching means for frictionally holding the wire against said bearing surface, whereby said length of unreeled wire is caused to move forward with the carriage, and braking means acting on said reel to hold the wire taut, gripping means for engaging the free end of the wire at completion of such forward movement and effecting a feeding of the wire by holding it against action of said friction clutch during return movement of the carriage, driving means for reciprocating said carriage including adjustable connections for determining the length of carriage movement, means for cutting the wire, and a second gripping means to engage the portion of wire to be severed.

10. In a machine of the character described, feeding mechanism as recited in claim 9 characterized by the opening through said tubular member being progressively reduced toward its forward end so as to center a wire of very small diameter, and including a tube of small diameter projecting from said extension in axial alignment with said tubular member, such tube functioning as a supporting guide for the free end of the wire.

11. In a machine of the character described, feeding mechanism as recited in claim 9 characterized by said driving means for reciprocating the carriage including an arm mounted for oscillating movement, a cam, a cam follower on said arm, and an adjustable link having one end pivotally connected to said carriage and its other end pivotally connected to said arm at a point adjustable lengthwise on the arm.

12. In a machine of the character described, a gripping unit for holding a work piece during a plurality of operations and mounted for intermittent movement to successive operative positions, said gripping unit including a pair of relatively movable jaws, reciprocating means for feeding a length of wire between and transversely of said jaws while the latter are open, means operating to cut the wire, means for closing the jaws on the work, and a forming tool mounted for oscillating movement and cooperating with said gripping unit to so bend the wire as to form a leg portion, the said feeding, cutting and forming operations occurring during the time interval in which the gripping unit occupies one of the said operative positions.

13. The combination, in accordance with claim 12, characterized by said forming tool being bifurcated to straddle said gripping jaws and double the wire upon itself to form side legs and a connecting portion.

14. In a machine of the character described, a gripping unit for holding a work piece during a plurality of operations, said gripping unit including a pair of relatively movable jaws, reciprocating means for feeding a length of wire between and transversely of said jaws while the latter are open, two rotatably mounted shafts arranged parallel to the direction of said feed, means for simultaneously rocking said shafts, an arm on each of said shafts, said arms being substantially parallel but angularly adjustable on their respective shafts relatively to each other, a pair of cutters on said arms for shearing the wire on movement of the arms toward each other, and a forming tool including an arm secured to one of said shafts and angularly adjustable thereon with respect to said cutters, said forming tool cooperating with said gripping unit to bend the wire substantially as and for the purpose set forth.

15. In a machine of the character described, a gripping unit for holding the work piece during a plurality of operations, said gripping unit including a pair of relatively movable jaws, reciprocating means for feeding a length of wire between and transversely of said jaws while the latter are open, two shafts mounted for rocking movement and arranged parallel to the direction of said feed, a spur gear fixed to one of said shafts and a smaller gear in mesh therewith fixed to the other shaft, whereby the shafts are caused to rock simultaneously but in reverse directions and with one traveling at a greater speed than the other, an arm carried by each of said shafts, said arms being substantially parallel but angularly adjustable on their respective shafts, a pair of cutters on said arms for shearing the wire on movement of the arms toward each other, a forming tool including an arm secured to said shaft carrying said smaller one of said gears and angularly adjustable thereon with respect to said cutters, said forming tool cooperating with said gripping unit to bend the wire U-shape.

16. As a means, in a machine of the character described, for cutting and holding straight a hard wire of small diameter, a pair of arms mounted for oscillating movement toward and from each other, a cutting disc on each of said arms, such cutters engaging in shearing relation as their arms move toward each other, and each being secured to its respective arm in any desired position of angular adjustment, one of said discs having its peripheral face serrated to provide regularly spaced transverse, alternately arranged ridges and grooves.

17. In a machine of the character described, having a plurality of stations at one of which a wire is doubled upon itself to form a connecting portion and side legs, and at another of which a coil is wound in each of said legs, the combination of means for feeding a predetermined length of wire at said first named station, means for cutting the wire, a turret mounted for rotary movement and having an end face, means for indexing the turret, a plurality of regularly spaced circumferentially arranged work holding units on said end face, each such unit comprising two relatively movable arms, one of which is fixed and the other pivoted intermediate its ends, wire gripping jaws on the outer ends of such arms, spring means acting on the inner end of each pivoted arm and normally functioning to hold its jaw end in closed position, and means engaging the inner end of said pivoted arms at predetermined time intervals to open the jaws.

18. In a machine of the character described, having a plurality of stations at one of which a wire is doubled upon itself to form a connecting portion and side legs, at another of which a coil is wound in each of said legs and at another of which the work piece is ejected, the combination of a housing, a hollow shaft rotatably mounted in said housing, a second shaft mounted to rotate independently in said hollow shaft and projecting beyond the ends thereof, a turret head secured to one end of the hollow shaft, a plurality of regularly spaced circumferentially arranged work holding units mounted on said head, each of said units comprising two relatively movable jaw members, spring means for normally holding the movable jaws in closed position, a cam on one end of said second shaft adapted at predetermined time intervals to open the jaws of a holding unit at the forming station and the jaws of another holding unit when at the ejection station, a spring retractable lever fixed to the other end of said second shaft, a rotatably mounted cam engaging said lever to effect a rocking of said second shaft, means for rotating said second cam, an indexing head fixed to the other end of said hollow shaft, driving means for effecting indexing of said head, and locking means for the turret and indexing head during intervals of rest.

19. A construction in accordance with claim 18 characterized by said indexing head having a plurality of inwardly opening pockets corresponding in number and angular arrangement to the said work holding units, and by said locking means including a spring pressed plunger axially movable in said housing and adapted to engage in any one of said pockets in registry therewith, a head on said plunger, a rod arranged parallel to said plunger and also axially movable in said housing, a head on one end of the rod engaging said head on the plunger whereby the plunger and rod move in one direction under said spring action, and means for retracting said rod and the plunger, to disengage the latter from one of said pockets, comprising a cam actuated lever engaging the other end of said rod.

20. A machine of the character described including a rotatable shaft, a turret fixed to said shaft, a plurality of spaced circumferentially arranged work holding units carried by said turret, means for effecting an intermittent rotary movement of the turret comprising an indexing head secured to said shaft, said head having a plurality of radially extending open channels, a continuously rotatable driving member, a lateral projection on said driving member adapted on each complete rotation of the driving member to register with one of said channels for effecting rotation of the indexing head equal in extent to the angular spacing of said channels, and means for locking the indexing head during intervals of rest.

21. A rotatable head having means for supporting a work piece on which work may be accomplished; a driving head, a shaft for relatively rigidly supporting said head and driving head, said driving head having a plurality of channel blocks corresponding to the number of work pieces, and means including a constantly rotatable driving member having a lug, said lug cooperating with a different one of said channels during each period of revolution so as to index said work head a predetermined portion of one revolution during each complete revolution of said rotatable driving member.

22. In a wire spring forming machine, a wire coiling mechanism including a bearing surface and gripping means whereby a wire is held substantially parallel with and in proximity to said bearing surface, a head arranged transversely of said bearing surface and mounted for both axial and rotary movement, means for rotating said head and additional means for moving the head toward and from said bearing surface, a wire engaging formation on an end of said head, a mandrel extending axially through said head and movable axially therewith, means for effecting axial movement of said mandrel, and spring means exerting pressure on said head to hold the wire in yielding contact with said bearing surface and permit retraction of the head as the coil is progressively wound on said mandrel.

23. In a wire spring forming machine, a wire coiling mechanism including a work holding unit comprising a pair of jaws for gripping a U-shaped wire, one of said jaws having an aperture therethrough and providing a plate with which the legs of said work piece are in juxtaposition but to one side of said aperture, two opposing tubular heads arranged transversely of said plate and on opposite sides thereof, said heads being mounted for both rotary and aixal movement, means for rotating said heads, means for moving the heads toward and from said plate, a wire engaging formation on the opposing ends of said heads, a mandrel, means for moving said mandrel axially through said aperture to provide a common mandrel for both said heads, spring means exerting pressure on said heads to hold the respective wire portions engaged thereby in yielding contact with said plate and permitting retraction of the heads as the coils are progressively wound on said mandrel.

24. In a machine of the character described, a carrier mounted for reciprocating movement, means for effecting such movement, a wire holding member including a bearing surface toward and from which said carriage is movable, a shaft mounted in said carrier with one end projecting beyond said carrier, said shaft having an opening extending axially therethrough and a counterbore of substantial depth from the said projecting end, a plunger keyed to said shaft and having a limited relative axial movement in said counterbore, a coiled compression spring housed in said bore and acting against said plunger, said plunger having a restricted axial opening, a wire engaging segmental projection on one end of said shaft, a wire engaging segment on the corresponding end of said plunger, the wire engaging shoulder of the first-named projection being set angularly in advance of that of the second named, a mandrel extending through said shaft and the restricted opening in said plunger and movable axially with said shaft, and means for effecting additional axial movement of said mandrel, the bearing surface of said plate having an opening into which said mandrel is projected and an opening concentric therewith for receiving the wire engaging projection on said shaft.

25. In a spring coiling machine, a work holding member, a rotatable and axially movable coil forming head including concentrically arranged members, means for moving said head axially to engage a work piece supported by said work holding member, means including one of said concentrically arranged head members to effect the beginning of the coil forming operation, and means including the other of said concentrically arranged members for continuing the coil forming operation.

26. In a spring coiling machine, a work holding member, a rotatable and axially movable coil forming head including concentrically arranged members, means for moving said head axially to engage a work piece supported by said work holding member, means including one of said concentrically arranged head members to effect the beginning of the coil forming operation, and means including the other of said concentrically arranged members for continuing the coil forming operation, and means including a spring bias for allowing axial movement of the inner of said concentric work head members as the coil is formed.

27. The combination, in a machine of the character described, with a turret, a plurality of circumferentially arranged, regularly spaced work holding units on the turret, each unit comprising a pair of jaws adapted to grip the connecting portion of a wire doubled upon itself to provide such connecting bend and side legs, one of said jaws being movable and the other fixed, the fixed jaw being a relatively thin flat plate having an aperture therethrough adjacent its gripping edge and an arcuate slot concentric with said aperture, means for actuating said jaws and means for indexing the turret; of a frame including spaced uprights, tie rods connecting the uprights, two opposing carriers guided for reciprocating movement on said rods on each side of said turret, cam actuated adjustable mechanism for causing simultaneous movement of said carriers toward and from each other, shock absorbing means for the carriers including coiled compression springs encircling said tie rods and interposed between the carriers; opposing coil winding heads rotatably mounted in said carriers and having axial openings therethrough coaxial with the aperture in the fixed jaw of the work holding unit, a mandrel extending through one of said winding heads and movable axially therewith, means for effecting independent axial movement of said mandrel whereby it is projected through the said jaw aperture and into the other head to provide a common mandrel for both heads, a pinion splined to each winding head, a shaft mounted for rocking movement, gear segments on said shaft meshing with said pinions to effect highly accelerated rotation of the winding heads first in one direction and then in the other, and cam actuated means for rocking said shaft.

28. A winding head for providing a coil on a length of wire including an outer cylindrical rotatable member, a spring pressed plunger within and keyed to said outer member and having a limited axial movement therein, wire engaging means on ends of said outer and inner rotatable members, said wire engaging shoulder on the outer member being set angularly in advance of that on said inner member, said shoulder on said outer member being spaced radially from said arbor as to permit engagement of the wire between the arbor and such shoulder.

29. In a spring forming machine, means for feeding and severing predetermined lengths of wire from a supply thereof, gripper means at a receiving station for supporting said lengths of wire intermediate their ends, dual coiling means at opposite sides of said supporting means, and actuating means for moving said supporting means from said receiving station to said dual coiling means.

30. In a wire shaping machine, an indexable support having arcuately spaced grippers for receiving and retaining lengths of wire, means for indexing said support, and arcuately spaced devices for coiling and for bending said gripped lengths of wire as the support is successively indexed.

31. A machine according to claim 30 including, in addition, unitary means for causing the release of the successively formed lengths of wire from one of said grippers and for causing another gripper to seize the supplied lengths of wire.

32. In a wire shaping machine, an intermittently movable gripper for conveying a length of wire from a receiving station past a shaping station to an ejecting station, means for actuating said gripper to seize a length of wire at said receiving station and to release the shaped wire at said ejecting station, and an air-jet for insuring the removal of said shaped wire upon release by said gripper.

33. In combination, in a machine of the character described, means for supplying wire, including a reciprocal coil support and tubular guide and means to insure movement of the wire with the guide during each forward stroke, means for gripping the free end of the wire after each forward stroke, and means for severing the wire located adjacent the forward end of the tubular guide in its retracted position.

34. In a machine of the class described, a support for a coiled supply of wire, and a tubular guide therefor, means for reciprocating said support and guide and means to grip the free end of the wire upon each forward reciprocation, whereby a length of wire supported in tension will be withdrawn from said supply during each reverse reciprocation.

References Cited in the file of this patent
UNITED STATES PATENTS

| | | |
|---|---|---|
| 756,823 | Booth | Apr. 12, 1904 |
| 812,076 | Neumann | Feb. 6, 1906 |
| 841,634 | Crouch | Jan. 15, 1907 |
| 861,915 | Struss | July 30, 1907 |
| 1,026,567 | Delihanty | May 14, 1912 |
| 1,192,631 | Hick | July 25, 1916 |
| 1,357,752 | Weber et al. | Nov. 2, 1920 |
| 1,529,746 | McDonald | Mar. 17, 1925 |
| 1,646,258 | Raus et al. | Oct. 18, 1927 |
| 1,673,185 | Des Combes | June 12, 1928 |
| 1,775,770 | Kondakjian | Sept. 16, 1930 |
| 1,821,894 | Otaka | Sept. 1, 1931 |
| 1,964,988 | Hill | July 3, 1934 |
| 2,310,914 | Gaines 3rd | Feb. 9, 1943 |